(12) United States Patent
Müller et al.

(10) Patent No.: US 6,673,420 B1
(45) Date of Patent: Jan. 6, 2004

(54) INORGANIC SHEET CARRYING SYMBOLS FOR MAKING PIGMENTS

(75) Inventors: Edgar Müller, Lausanne (CH); Olivier Rozumek, St. Martin (CH); Anton Bleikolm, Ecublens (CH)

(73) Assignee: SICPA Holding S.A., Prilly (CH)

( * ) Notice: Subject to any disclaimer, the term of this patent is extended or adjusted under 35 U.S.C. 154(b) by 0 days.

(21) Appl. No.: 09/743,792

(22) PCT Filed: Jul. 31, 1999

(86) PCT No.: PCT/EP99/05551
§ 371 (c)(1),
(2), (4) Date: Feb. 20, 2001

(87) PCT Pub. No.: WO00/08596
PCT Pub. Date: Feb. 17, 2000

(30) Foreign Application Priority Data

Aug. 6, 1998 (EP) .............................................. 98810755

(51) Int. Cl.[7] ........................... B32B 1/00; B32B 31/00; C09D 11/00; B42D 15/00
(52) U.S. Cl. ................... 428/187; 428/195.1; 428/209; 428/212; 156/153; 156/272.8; 283/72; 106/31.13; 106/31.65
(58) Field of Search .................. 428/187, 604, 428/212, 668, 699, 542.2, 172, 209, 195.1; 156/153, 272.8; 106/31.13, 31.65, 403; 283/70, 72; 264/482

(56) References Cited

U.S. PATENT DOCUMENTS

| | | | | |
|---|---|---|---|---|
| 2,071,411 | A | * 2/1937 | Lamesch | .................... 428/167 |
| 4,243,734 | A | 1/1981 | Dillon | |
| 4,434,010 | A | 2/1984 | Ash | |
| 5,059,245 | A | 10/1991 | Phillips et al. | |
| 5,084,351 | A | 1/1992 | Phillips et al. | |
| 5,135,812 | A | 8/1992 | Phillips et al. | |
| 5,171,363 | A | 12/1992 | Phillips et al. | |
| 5,279,657 | A | 1/1994 | Phillips et al. | |
| 5,552,458 | A | * 9/1996 | Hall et al. | .................... 523/403 |
| 5,650,248 | A | * 7/1997 | Miekka et al. | ................. 430/1 |
| 5,672,410 | A | * 9/1997 | Miekka et al. | ............. 428/148 |
| 5,691,063 | A | 11/1997 | Davis et al. | |
| 5,744,223 | A | 4/1998 | Abersfelder et al. | |
| 5,770,299 | A | 6/1998 | Dannenhauer et al. | |
| 5,786,090 | A | 7/1998 | Fisher et al. | |

FOREIGN PATENT DOCUMENTS

| | | |
|---|---|---|
| GB | 2 289 150 | 11/1995 |
| HU | 55151 | 9/1990 |
| HU | 65956 | 6/1994 |
| HU | 55151 | 9/1999 |

* cited by examiner

*Primary Examiner*—Donald J. Loney
(74) *Attorney, Agent, or Firm*—Shoemaker and Mattare

(57) ABSTRACT

Inorganic sheets (10) of at least two surperposed layers are provided with one or more symbols (20) which have a size of between 1 and 10 μm. The inorganic sheet is made up into pigment flakes (15). The symbols on the pigment flakes (15) allow a tracing of compositions such as printing inks or paintings and of substrates carrying such compositions.

25 Claims, 4 Drawing Sheets

INORGANIC SHEET CARRYING SYMBOLS FOR MAKING PIGMENTS

The invention relates to an inorganic sheet carrying at least one symbol for making pigments of a predetermined size for the marking of articles and to a method for forming such inorganic pigments and a pigment according to the preamble of the independent claims.

The incorporation of microscopically small aluminum platelets carrying information in the form of symbols in coating compositions has already been described in U.S. Pat. No. 5,744,223. The aluminum platelets are formed as embossed sections in a thin aluminum foil which thereafter is cut to platelet size. The embossed platelets serve as information carriers to hinder the unauthorised sale or theft of vehicles.

Since the aluminum platelets are silvery opaque, one disadvantage is their visible, eye-catching appearance in coating composition, particularly in printing inks having either no colour or different colours than the platelets. This makes the fact that an article has been tagged immediately obvious to any counterfeiter. On the other hand, in coating compositions which are of the same colour as the aluminum platelets the detection of embossed aluminum platelets is extremely difficult.

Applying symbols to foils by means of embossing is limited to those materials which are ductile (aluminum, plastic, etc.). It is therefore not possible to apply symbols to brittle and non-ductile materials by means of a direct embossing.

Another disadvantage of the embossing procedure is the risk to damage the passivating layer of the aluminum particle which protects the particles from detrimental influences such as water.

Object of the invention is to avoid the disadvantages of the prior art, particularly to provide pigments and improved means and ways to make pigments carrying improved safety features for a broad variety of applications.

It is a particular object of the present invention to provide symbol carrying pigments with matching colours with respect to the colour of the coating composition or printing ink.

It is another object to provide pigments carrying a symbol which can be easily detected within coating compositions having dark or strong colours.

It is still object to provide pigments having both overt and covert anti-counterfeiting properties.

It is a further object to provide a method for applying symbols on materials which do not have the ductility of aluminum or plastic.

It is a further object to protect any metal layer against corrosion the surface of which may have been damaged during a direct embossing process.

These objects are solved by the features of the independent claims.

In particular they are solved by providing an inorganic sheet for making pigments of a predetermined size, carrying at least one symbol, wherein the sheet comprises at least two superposed layers which are different in their physical and/or chemical composition.

Pigments made from inorganic sheets are usually of a flake like shape. In the context of this invention all types of lustre or effect pigment flakes which consist of at least two superposed layers and which are made from inorganic sheets are suitable. Particularly good results are achieved with pearl lustre pigments according to the definition of DIN 55943: 1993-M and interference pigments according to the definition of DIN 55944: 1990-04. Pigments having at least two layers of different colours are well suited, too.

This inorganic sheet of at least two superposed layers may be produced, for instance, by any of the known techniques for applying thin films, such as vacuum evaporation, physical vapour deposition, chemical vapour deposition, sputtering or wet processes, as described, for example, in Ullmann's Encyclopedia of Industrial Chemistry, fifth edition, volume A6, page 67, Verlag Chemie, Weinheim, Germany.

A preferred embodiment of the present invention is an inorganic sheet having a viewing angle dependent variation of colour and carrying symbols for making pigments.

Pigment flakes having viewing angle dependent variation of colour are wellknown. They are of particular interest for the incorporation into printing inks for security documents. Since the angle-dependent colour variation is not reproducible by photocopying machines, these pigment flakes provide the document with a strong security feature. The pigment flakes, their production and various applications have been already described in numerous patents, e.g. U.S. Pat. No. 4,434,010, U.S. Pat. No. 5,059,245, U.S. Pat. No. 5,084,351, U.S. Pat. No. 5,135,812, U.S. Pat. No. 5,171,363, U.S. Pat. No. 5,279,657.

The working principle of these optically variable pigment flakes is based on a sequence of planar thin layers which are parallel to each other with different optical characteristics. The hue, the colour shift and chroma of the pigment flakes depend on the materials constituting the layers, the sequence of the layers, the number of layers and the layer thickness.

A simple inorganic sheet having a viewing angle dependent variation of colour to which symbols can be applied and which can be comminuted to pigment flakes of a predeterminable size, consists of two planar, partially reflecting, i.e. semi-transparent, metal layers which are substantially parallel to each other and which are separated by a layer of a low refractive index material e.g. $SiO_2$ or $MgF_2$. The low refractive index material often is described as dielectric material. This type of pigment flake which is based on the Fabry-Perot principle was first patented by Du Pont in U.S. Pat. No. 3,438,796.

The terms semi-transparent, transparent, opaque, totally and partially reflecting all relate to the light in the visible range of the electromagnetic spectrum, i.e. from about 400 nm to about 700 nm.

A significant improvement with respect to the colour saturation (chroma) and the angle dependent colour variation was achieved by an incorporation of an opaque totally reflecting thin layer into the stack of dielectric and partially reflecting layers. This can result in a symmetric structure, having the opaque totally reflecting layer with first and second surfaces as a central layer. To achieve a symmetric multilayer stack on the first and second surface of the opaque totally reflecting layer a thin layer of a dielectric material is deposited; subsequently, semi-transparent, partially reflecting thin layers are applied on top of both of the dielectric layers. The minimum for a symmetric structure are thus five layers. However, an asymmetric stack can be produced as well, with a minimum of three layers consisting of one opaque totally reflecting layer, one dielectric layer and one partially reflecting partially transmitting layer.

The opaque totally reflecting layer is usually made of a metal and preferably consists of aluminum in a thickness of up to 300 nm, but preferably in the range of 50–150 nm. Gold, copper and silver are applicable as alternative metals.

The dielectric material must be transparent, with a refractive index not higher than 1.65. Usually $SiO_2$ or $MgF_2$ are deposited as a dielectric, in a thickness between 300 and 500 nm.

The partially reflecting semi-transparent layer or layers may consist of a metal, a metal-oxide or a metal-sulphide. This can be aluminum, nickel, Inocel, chromium, $MoS_2$, $Fe_2O_3$, etc. Semi-transparency of metal layers is a function of the layer thickness. Usually the thickness of the semi-transparent layer is between 5 and 20 nm.

The inorganic sheet having viewing angle dependent variation of colour is preferably produced on a supporting material, such as a flexible web of e.g. PET. In the majority of the cases a first semi-transparent layer is deposited on the flexible web. After having deposited all subsequent layers, the multi-layered coating is detached from the flexible web whereby it typically breaks into small pieces of irregular shape and size. These pieces require further grinding to achieve the desired pigment flake size, suitable for coating compositions and particularly printing inks or for incorporation into bulk material.

As already described, pigments which have a viewing angle dependent shift of colour provide documents with a strong anti-copy feature. This anti-counterfeiting feature is further enhanced by applying symbols on at least one of the layers. Moreover such pigment flakes can serve as data carriers.

The symbols are formed on at least one of the layers of the inorganic sheet by a local change of optical properties, preferably reflectivity. This is achieved by at least partial destruction of at least one layer.

The size and number of symbols must be chosen such as to allow a proper identification of the inscription after breaking up and grinding to the desired pigment flake size. In a first requirement the symbols must not extend over too many pigment flakes. The symbols are preferably of a size between 0.5–20 μm and even more preferably of a size between 1–10 μm. In the context of this specification, size means the approximate width of symbols. This size range fits with the pigment flake size, which, on average, is between 5 and 40 pm but not greater than 100 μm. However, the flakes can be ground down to sizes of 2 to 5 μm without destroying their colour characteristics.

As a second requirement, a sufficient amount of the total number of pigment flakes has to carry a symbol. As a general rule not less than 1 weight-% of the total weight of pigment flakes present in an ink composition should carry a symbol in order to allow an easy and quick detection and reading of the information.

The symbols which are applied to least one of the layers of the pigment flake are readable by means of light or electron microscopy.

The optical properties, in particular of the pigment flakes showing viewing angle dependent colour variation but also of other lustre or effect pigments, allow an easy and quick localization of the position within the bulk material, coating or ink composition where to retrieve and read the inscribed information. The detection with any type of common light microscope is particularly simple if the local change of optical properties consists of a local reduction of reflectivity or a change of colour of the layer. The pigment flakes can be produced in any colour, either to match with the colour of the coating composition of printing ink or to contrast with it.

Pearl lustre pigments, for example, may even be incorporated into transparent inks without adversely affecting their transparency. This is due to the small amount of pigment flakes necessary to allow marking, detection and reading. The smallest amount of pigment flakes possible is about 1 weight-% of the total weight of a coating composition or printing ink.

More than one symbol can be applied to the pigment flakes. In a preferred embodiment of the invention, the symbol consists of a sequence of alphanumeric characters and/or logos and/or digital information. Such a sequence may be used to inform e.g. on the final user, the place of manufacture, the manufacturing serial number etc.

The symbols can particularly easily be applied by at least partial ablation of a layer by a short wavelength, high power laser having a wavelength not longer than 12 μm and preferably not longer than 1.5 μm. In particular, a UV excimer laser or a Nd-Yag laser in high power, pulsed mode is used, and the symbols are "punched" shot by shot onto the surface of the layer by means of a projection mask and corresponding optics. A surface area of up to 3 $cm^2$ can be marked per shot, and up to 400 shots per second can be fired with current models of such excimer lasers.

Alternatively, a continuous wave (CW) laser, coupled to a processor controlled deflecting unit of known technology, could be used to inscribe the symbols onto the layer surface. The inscription process is, however, more time consuming than the punching operation, and industrial production speeds are not easily achieved.

At short wavelengths, especially in the UV, laser ablation works by direct breaking of chemical bonds. In most cases the process results in an atomization of the ablated matter, rather than in heating the substrate to evaporation temperatures. This adds an advantage to the method of the present invention: the substrate is not exposed to excessive heat.

According to the present invention, symbols are applied to at least one of the layers of the inorganic sheet. This can be the two outer surfaces of the outer layers of the sheet or even one of the inner surfaces. At least one symbol can be applied during the manufacture of the sheet.

In the context of this specification inner surfaces are formed within the stack at the interface between two adjacent layers which are different in their physical or chemical characteristics. The outer surface is either the interface between one of the two last layers in the stack and the surrounding medium or the interface between the last layer having a function with regard to the special optical characteristic of the pigment flake, e.g. colour and chroma, and a layer having mere protective function.

The depth of the symbols can be adapted, i.e. limited to the thickness of one layer. However, an extension to the underlying layer is also possible. The symbol can be directly applied to the material prior to depositing the next layer or layers. Additionally the symbol can be applied to more than one of the layers.

Instead of forming the symbols by means of laser radiation, symbols can be applied by other means such as by embossing or printing. In a preferred embodiment, this is achieved by embossing the flexible web. When the material is deposited on the web, the embossed symbols are transferred to the first and subsequent layers. But as a matter of fact the surface of the layers will be levelled the more layers are superposed.

The symbol may also be created on the flexible web by means of any deposition technique including micro-printing.

Independently of the method used to apply the symbols onto the flexible web, the first layer of the multi-layered stack deposited thereon have the reverse of the symbols carried by the web.

In a further, alternative method, it is conceivable to form invisible symbols, i.e. symbols which can only be visualized by means of a special detecting device. Symbols can also consist in a local change of electric, magnetic or electromagnetic properties. It is possible to apply further layers (i.e. for protection) to the sheet after forming the symbols or to the particles after grinding. Provided the additional layers will not prevent the information from being retrieved.

The pigment flakes carrying a symbol according to the present invention may be incorporated into any type of coating composition, bulk material, and preferably into printing inks. If articles coated or imprinted with such a coating or ink composition are analyzed with an appropriate analyzing device, it is possible to read the symbols and to retrieve the information. This is especially useful for marking and authentication of bank notes, cheques, etc. or branded goods.

The information represented by the symbols applied to the pigment flakes can also be automatically retrieved for the purpose of achieving machine readability of security documents. An article carrying such a coating or the coating as such can be analyzed by means of an analyzing device, such as a microscope in the case of localised visible markings.

Any of the known printing techniques, such as gravure, flexographic, offset, letterpress or screen printing may be applied in connection with ink containing pigments according to the present invention which will be described in detail in the following embodiments and with reference to the accompanying drawings in which:

BRIEF DESCRIPTION OF THE DRAWING

FIG. 1 shows an inorganic sheet 10 prior to grinding to pigment flakes 15 (FIGS. 6 and 8). The sheet consists of a first layer 11 carrying a symbol 20 on its outer surface 13 and a second layer 12 with an outer surface 13 and an inner surface 14.

FIG. 2 shows a cross-section through an inorganic sheet comprising a dielectric layer 23 with a first surface 29 and a second surface 28. Deposited on both the first and second surface 28, 29 of the dielectric layer is a layer of a semi-transparent partially reflecting layer 21. The first and second surfaces 28, 29 are simultaneously inner surfaces 14 of the multi-layered stack 18. A plurality of symbols 20 is applied on the outer surface 13 of the outer layer 21 and on the inner surface 14 of the outer layer 21.

FIG. 3 shows schematically a method of creating symbols on a sheet 10 according to the present invention. An inorganic sheet 10 is formed on a flexible web 19, comprising a first partially reflecting layer 21, on the flexible web 19 a dielectric layer 23 with first and second surfaces (29, 28), a totally reflecting layer 22 with first and second surfaces (26, 28), a further dielectric layer 23 and a second partially reflecting layer 21.

Figure 1:
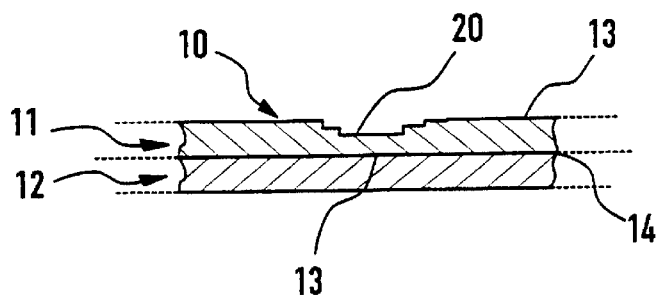
FIG. 1 is an enlarged cross-sectional view of the inorganic sheet carrying a symbol according to the present invention as shown in FIG. 8b.
Figure 2:
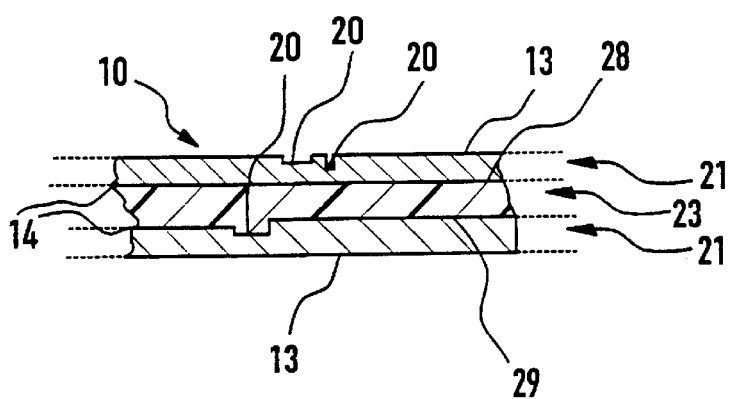
FIG. 2 represents a cross-sectional view of an inorganic sheet having a viewing angle dependent colour variation and carrying symbols.

More specifically an inorganic sheet was formed on a symmetric PET-web 19, with layers of Cr (20 nm) 21, $MgF_2$ (400 nm) 23, Al (60 nm) 22, $MgF_2$ (400 nm) 23, Cr (20 nm) 21.

Symbols 20 were created on the inorganic sheet 10 by means of a "Lambda Phsyics" KrF excimer laser 30 at 248 nm. This laser can deliver pulse energies to 550 $mJ/cm^2$ with pulse rates up to 400 Hz. Symbols 20 were "punched" into the outer surface 13 of the partially reflecting layer 21 of the inorganic sheet 10, using single laser shots of 200 $mJ/cm^2$. This energy is sufficient to ablate the surface chromium layer 21. Symbols 20 of 5.4 μm in height were perfectly readable under the microscope.

Figure 4A:
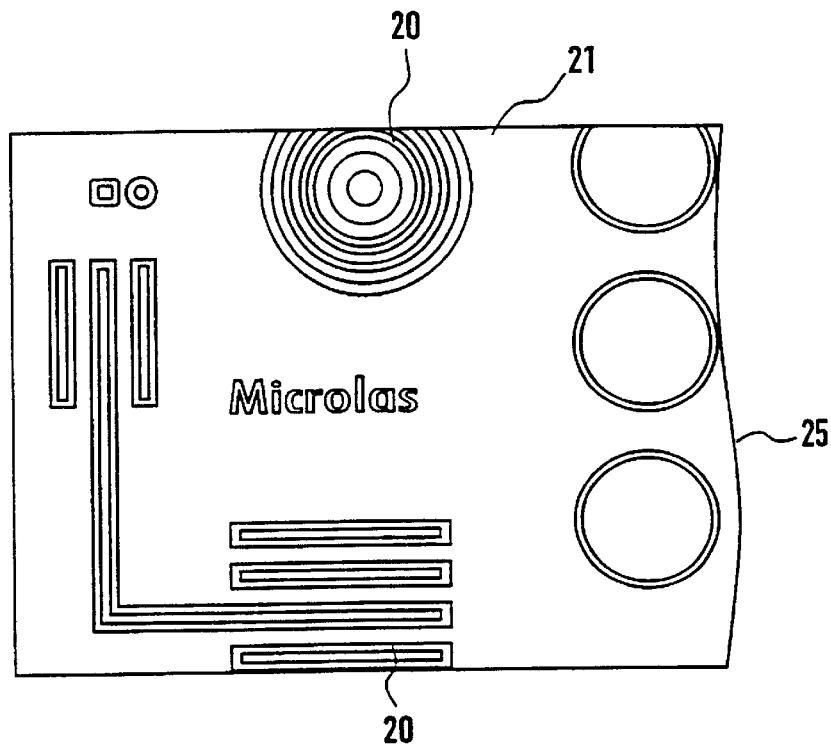
Figure 4B:
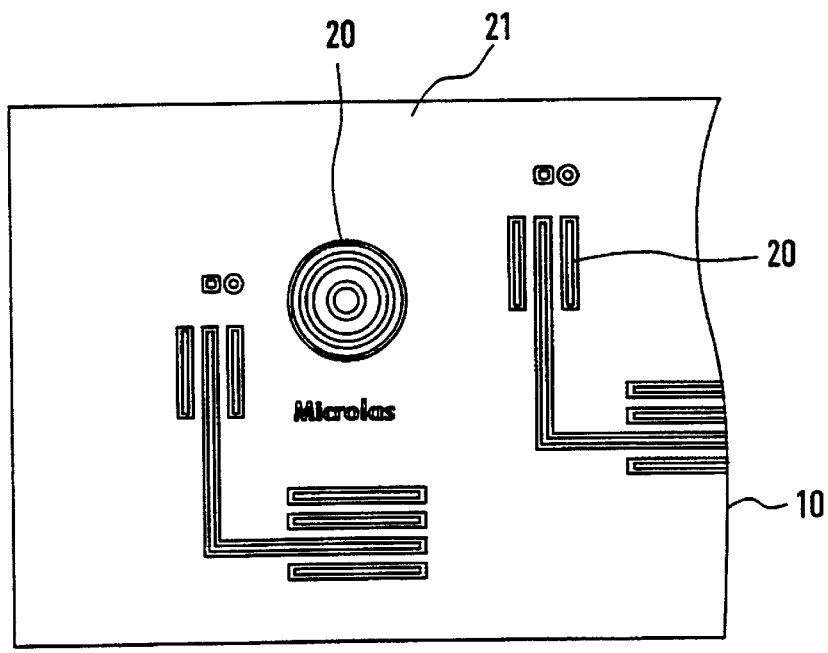

FIGS. 4a and 4b show an enlarged section of the symbol carrying surfaces (13, 14) of the inorganic sheet 10. The symbols 20 in 4a are 11.4 μm high; in 4b they are 5.4 μm high.

Figure 3:
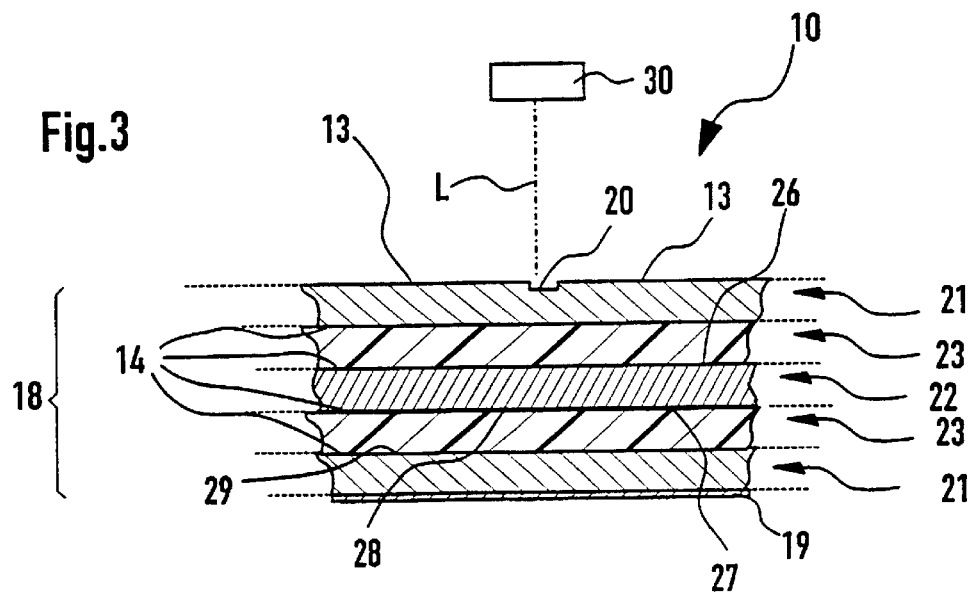
FIG. 3 is another alternative example for an inorganic sheet of FIG. 2, FIGS. 4a and 4b show an enlarged view of one of the layer surfaces carrying a plurality of symbols.
Figure 5:
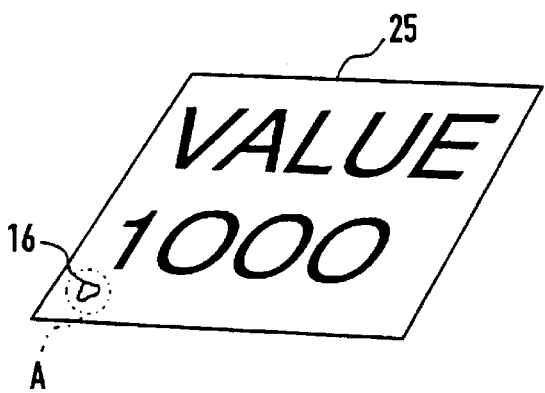
FIG. 5 is a schematic view of a substrate bearing a coating according to the present invention.
Figure 6:
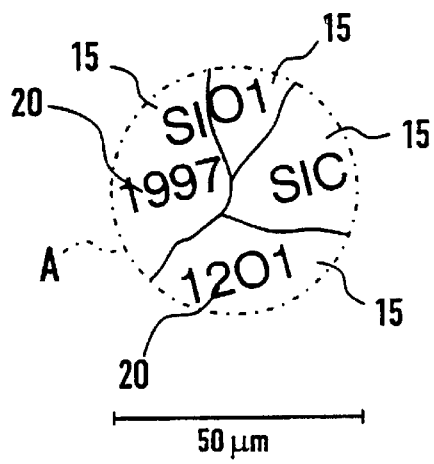
FIG. 6 is an enlarged view of the substrate of FIG. 4.

FIG. 5 shows a substrate 25 which is covered by a coating or printing ink 16 comprising pigment flakes 15. The section A of the substrate 25 shown in FIG. 5 is enlarged in FIG. 6. The pigment flakes 15 in the coating or ink layer 16 have optically variable properties. The substrate 25 carrying such a coating or printed image comprising pigment flakes 15 can be observed under a microscope and the symbols 20 can be read. The concentration of pigment flakes 15 will determine the degree of coverage of the substrate. The pigment flakes 15 have been made from a sheet 10 (FIG. 3) carrying as symbols 20 the imprint "SICPA" as manufacturer identification, "1997" to identify the year of manufacturing and "1201" as a lot number. Statistically, all complete information will be contained in a certain number of pigment flakes even if some of the flakes contain only part of an individual symbol 20.

Figure 7:
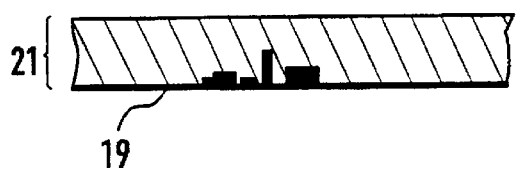
FIG. 7 is a cross section through an enlarged view of flexible web bearing a symbol and having a first layer deposited thereon.

FIG. 7 shows an enlarged view of a flexible web 19 bearing a symbol 20 produced by micro-embossing or micro-printing. Deposited thereon is a first layer 11 which bears the symbol 20 in an inverse way.

Figure 8A:
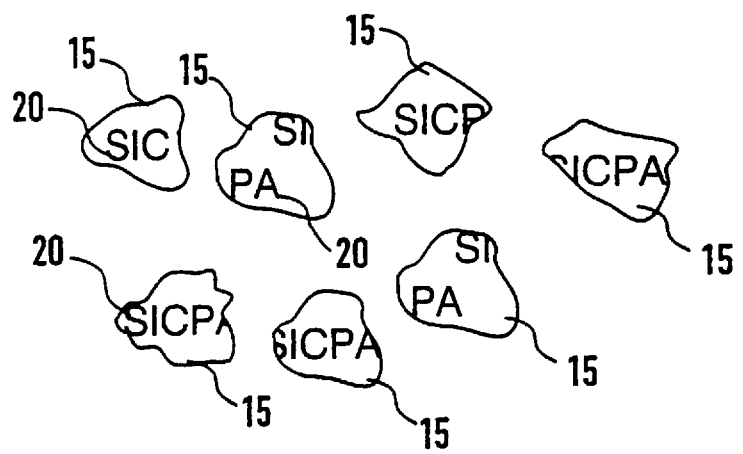
FIG. 8a is a schematic view of a plurality of pigment flakes made from the sheet shown in FIG. 8b according to the present invention.
Figure 8B:
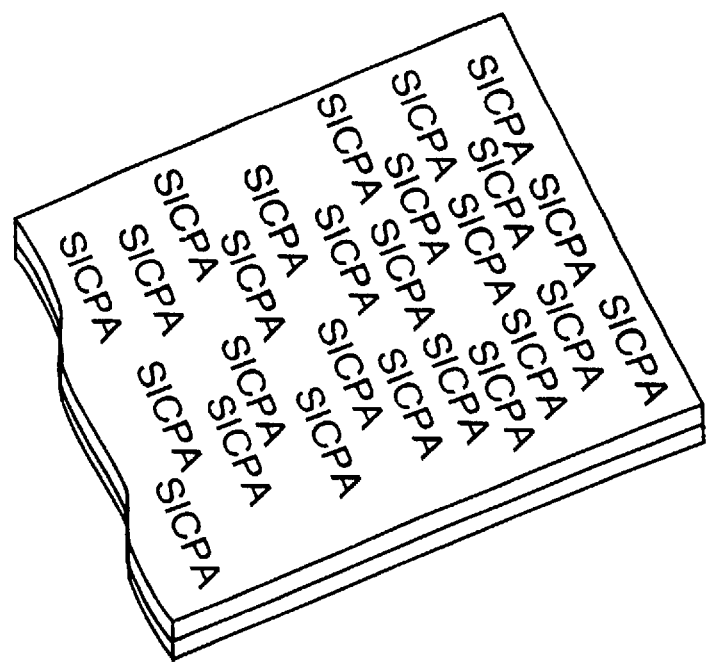
FIG. 8b shows an inorganic sheet carrying symbols.

FIG. 8a shows a plurality of pigment flakes 15 obtained by detaching and grinding the inorganic sheet 10 of FIG. 8b to the desired particle size. The pigment flakes 15 have a size such that they can comprise a number of symbols 20, typically 2 to 15 symbols.

What is claimed is:

1. An inorganic grindable sheet for making pigments of a predeterminable size, said sheet having a viewing angle dependent shift of color and two outer surfaces substantially parallel to each other and comprising at least a first and a second and a third layer, said first and said second layer being selected from materials having different physical properties, wherein said first layer is of a low refractive index material, said second layer is a semi-transparent partially reflecting layer, and said third layer is selected from the group consisting of a semi-transparent partially reflecting layer and an opaque totally reflecting layer, said second layer being superposed over said first layer whereby an inner surface is formed between the first and the second layer, said third layer being superposed over said first layer opposite to the second layer whereby an inner surface is formed between the first and the third layer, said sheet further comprising one or more symbols being formed by at least partial ablation created by a UV excimer laser.

2. An inorganic sheet according to claim 1, wherein the first and the second layer are selected from materials having different chemical compositions.

3. An inorganic sheet according to claim 1, wherein at least one sequence consisting of the first and second layer are superposed over both sides of said third layer, thus forming a sheet comprising inner surfaces between the third and first layers and between the first and second layers.

4. An inorganic sheet according to claim 1, wherein at least one of the outer surfaces of the sheet comprises the one or more symbols.

5. An inorganic sheet according to claim 1, wherein the inner surface comprises the one or more symbols.

6. An inorganic sheet according to claim 1, wherein at least one of the outer surfaces and the at least one inner surface comprise the one or more symbols.

7. An inorganic sheet according to claim 1, wherein the one or more symbols have a dimension of 0.5 to 20 $\mu$m.

8. An inorganic sheet according to claim 7, wherein said dimension is 1–10 $\mu$m.

9. A pigment made by grinding an inorganic sheet according to claim 1.

10. A coating composition comprising pigment flakes according to claim 9 in an amount of at least 1 weight % of the total weight of pigments, and a binder.

11. A substrate coated with a composition according to claim 10.

12. A security document printed with a coating composition according to claim 10.

13. A coating composition according to claim 10, wherein the composition is a printing ink.

14. A method of making inorganic pigments carrying at least one symbol comprising the steps of
   a) providing a multi-layered sheet having a viewing angle dependent shift of color and two outer surfaces substantially parallel to each other, said sheet comprising at least a first and a second and a third layer formed by superposition of the layers whereby an inner surface is formed between the first and the second layer and an inner surface is formed between the first and the third layer, wherein the first and the second layers have physical properties different from each other, wherein said first layer is of a low refractive index material, said second layer is a semi-transparent partially reflecting layer, and said third layer is selected from the group consisting of a semi-transparent partially reflecting layer and an opaque totally reflecting layer;
   b) applying at least one symbol on at least one of said surfaces of the layers during and/or after terminating step a) by at least partial ablation with a UV excimer laser;
   c) grinding said sheet of step b) to produce pigment particles.

15. A method for making inorganic pigments according to claim 14, said pigments having a viewing angle dependent shift of color and carrying at least one symbol, said method comprising the steps of
   (a) providing a flexible web;
   (b) forming the multi-layered sheet on said web by depositing thereon at least one semi-transparent partially reflecting layer, at least one layer of a low refractive index material, and at least one opaque totally reflecting layer;
   (c) forming at least one symbol on at least one of the surfaces of the layers during and/or after terminating step b) by at least partial ablation with a UV excimer laser.
   (d) detaching said sheet from the flexible web;
   (e) grinding said sheet to a pigment flake size of 0.5 to 100 $\mu$m.

16. A method according to claim 14, wherein said pigment particles have a size of 5–40 $\mu$m.

17. An inorganic grindable sheet for making pigments of a predeterminable size, said sheet having a viewing angle dependent shift of color and two outer surfaces substantially parallel to each other and comprising at least a first and a second and a third layer, said first and said second layer being selected from materials having different chemical compositions, said second layer being superposed over said first layer whereby an inner surface is formed between the first and the second layer, said third layer being superposed over said first layer opposite to the second layer whereby an inner surface is formed between the first and the third layer, said sheet further comprising one or more symbols being formed by at least partial ablation created by a UV excimer laser.

18. An inorganic sheet according to claim 17, wherein at least one of the outer surfaces of the sheet comprises the one or more symbols.

19. An inorganic sheet according to claims 17, wherein the at least one inner surface comprises the one or more symbols.

20. An inorganic sheet according to claim 17, wherein at least one of the outer surfaces and the at least one inner surfaces comprise the one or more symbols.

21. An inorganic sheet according to claim 17, wherein the one or more symbols have a maximum dimension of 0.5 to 20 $\mu$m.

22. An inorganic sheet according to claim 21, wherein said dimension is 1–10 $\mu$m.

23. A coating composition comprising pigment flakes produced from a sheet according to claim 17 in an amount of at least 1 weight % of the total weight of pigments, and a binder.

24. A coating composition according to claim 23, wherein the composition is a printing ink.

25. A substrate coated with a composition according to claim 23.

* * * * *